US011128373B1

(12) United States Patent
Podmore et al.

(10) Patent No.: US 11,128,373 B1
(45) Date of Patent: Sep. 21, 2021

(54) SYSTEM AND METHOD FOR RANGE ENHANCED HIGH-SPEED FREE-SPACE OPTICAL COMMUNICATION

(71) Applicant: COM DEV LTD., Mississauga (CA)

(72) Inventors: Hugh Podmore, Toronto (CA); Alan Scott, Arnprior (CA); Thomas Ducellier, Ottawa (CA)

(73) Assignee: COM DEV LTD., Mississauga (CA)

( * ) Notice: Subject to any disclaimer, the term of this patent is extended or adjusted under 35 U.S.C. 154(b) by 0 days.

(21) Appl. No.: 16/945,112

(22) Filed: Jul. 31, 2020

(51) Int. Cl.
*H04B 10/00* (2013.01)
*H04B 10/112* (2013.01)
*H04B 10/516* (2013.01)
*H04B 10/564* (2013.01)
*H04J 14/00* (2006.01)

(52) U.S. Cl.
CPC ......... *H04B 10/112* (2013.01); *H04B 10/516* (2013.01); *H04B 10/564* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
See application file for complete search history.

(56) References Cited

U.S. PATENT DOCUMENTS

| 6,661,975 B1 * | 12/2003 | Hall | H04B 10/118 398/177 |
| 9,264,147 B2 | 2/2016 | Caplan et al. | |
| 9,647,765 B2 | 5/2017 | Caplan et al. | |
| 2016/0043800 A1 * | 2/2016 | Kingsbury | H04B 7/18517 398/125 |
| 2018/0343066 A1 * | 11/2018 | Caplan | H04B 10/556 |

OTHER PUBLICATIONS

Spellmeyer et al., "A multi-rate DPSK modem for free-space laser communications", Proceedings of SPIE, 2014, vol. 8971, pp. 89710J-1 to 89710J-9.

(Continued)

*Primary Examiner* — Daniel G Dobson
(74) *Attorney, Agent, or Firm* — Bereskin & Parr LLP/S.E.N.C.R.L., s.r.l.; Isis E. Caulder; Ahmed Elmallah

(57) ABSTRACT

Various embodiments for a system and method for a range-enhanced high-speed free-space optical communication are described herein. Generally, the optical communication system may include a first modulator, a second modulator and an average-power limited optical amplifier. The first modulator may receive an input optical signal and generate a modulated optical signal. The second modulator may receive the modulated signal and may be operable to turn-off a select number of pulses in each modulated pulse frame of the modulated signal to generate a low-duty cycle modulated signal. The average-power limited optical amplifier may then generate an amplified modulated signal from the low-duty cycle signal, wherein the amplified modulated signal comprises a plurality of amplified pulse frames with each amplified pulse frame defining an amplified version of a corresponding each low-duty cycle pulse frame.

20 Claims, 9 Drawing Sheets

(56) References Cited

OTHER PUBLICATIONS

Iglesias Olmedo et al., "Effective Linewidth of Semiconductor Lasers for Coherent Optical Data Links", Photonics, 2016, 3(2): 39 (10 pages).

Gianni et al., "Efficient Parallel Carrier Recovery for Ultrahigh Speed Coherent QAM Receivers with Application to Optical Channels", Journal of Electrical and Computer Engineering, 2013, vol. 2013, Article ID 240814, 14 pages.

Taylor, "Phase Estimation Methods for Optical Coherent Detection Using Digital Signal Processing", 2009, 27(7): 901-914.

Navarro et al., "Carrier Phase Recovery Algorithms for Coherent Optical Circular mQAM Systems", Journal of Lightwave Technology, 2016, 34(11): 2717-2723.

Portela et al., "Analysis of signal processing techniques for optical 112 GB/s DP-QPSK receivers with experimental data", Journal of Microwaves, Optoelectronics and Electromagnetic Applications, 2011, 10(1): 155-164.

"Coherent Optical Systems", Photonics Communications Research Laboratory (PCRL), PowerPoint Presentation, 2015, 47 slides (24 pages) <https://www.photonics.ntua.gr/OptikaDiktyaEpikoinwnias/Lecture_4_CoherentOptical_DSP.pdf>.

\* cited by examiner

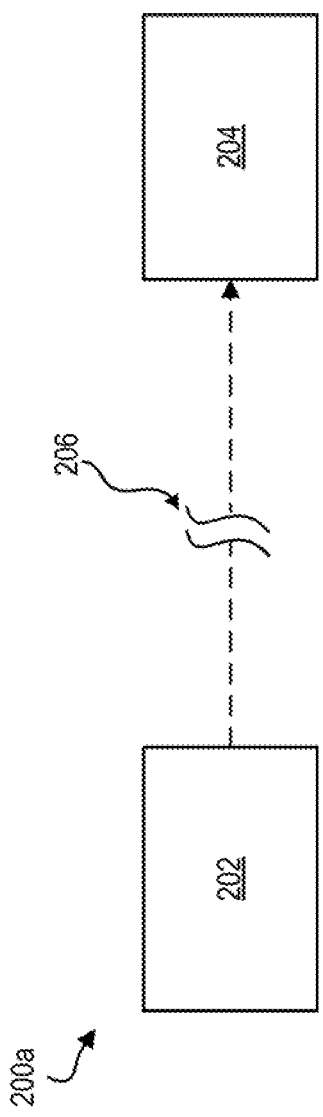
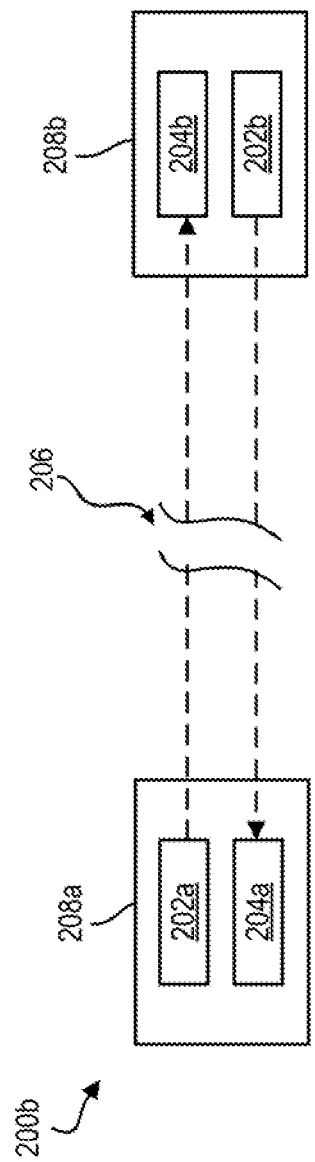

SYSTEM AND METHOD FOR RANGE ENHANCED HIGH-SPEED FREE-SPACE OPTICAL COMMUNICATION

FIELD

The present subject-matter relates to optical communication, and more particularly to a system and method for range-enhanced high-speed free-space optical communication.

INTRODUCTION

The following is not an admission that anything discussed below is part of the prior art or part of the common general knowledge of a person skilled in the art.

Free space optical (FSO) communication links are often deployed for transmitting modulated optical signals, carrying data information, across vacuums and/or air mediums, and over large propagation distances spanning thousands or even hundreds of thousands of kilometers. By way of example, FSO links may be deployed for inter-satellite communication, as well as communication between satellites and airborne or terrestrial objects.

Owing to the large propagation distances characteristic of FSO links, transmitted signals often experience high signal strength attenuation (e.g., high range loss) over the course of propagation. This, in turn, results in weakened signals received at optical receiver terminals, and corresponding challenges in demodulating and recovering the received signal to extract data information. The problem is further aggravated in cases of high speed data communication (e.g., FSO links operating at over 100 Gbps), in which high received signal strength (i.e. low range loss) is required to quickly and accurately extract transmitted data.

In view of the foregoing, there is a desire for an optical communication system which can mitigate for range loss issues in transmitted optical signals, and which has further application in the context of high data rate communication.

SUMMARY OF VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

According to one broad aspect of the invention, there is disclosed a system for free-space optical communication, the system comprises: a first modulator for receiving an input optical signal and generating a modulated optical signal, wherein the modulated signal includes a plurality of modulated pulse frames, and each modulated pulse frame comprises a first number of pulses; a second modulator coupled to the first modulator, the second modulator receiving the modulated signal and operable to turn-off a select number of pulses in each modulated pulse frame to generate a low-duty cycle modulated signal, wherein the low-duty cycle modulated signal comprises a plurality of low-duty cycle pulse frames with each low-duty cycle pulse frame corresponding to one of the modulated pulse frames, and each low-duty cycle pulse frame comprises a second number of pulses, wherein the second number of pulses is equal to the first number of pulses minus the select number of pulses; and an average-power limited optical amplifier coupled to the second modulator, for generating an amplified modulated signal from the low-duty cycle signal, wherein the amplified modulated signal comprises a plurality of amplified pulse frames with each amplified pulse frame defining an amplified version of a corresponding each low-duty cycle pulse frame; wherein each amplified pulse frame, in the amplified signal, has an average power corresponding to the average output power ($P_{average}$) of the optical amplifier, and wherein each amplified pulse, in each amplified pulse frame, has an amplified pulse power that corresponds to a ratio of the average output power, wherein the ratio corresponds to a ratio of the first number of pulses to the second number of pulses, and wherein the amplified pulse power of each pulse in each amplified pulse frame is adjustable by adjusting the select number of pulses turned-off by the second modulator in each modulated pulse frame.

In some embodiments, the system further comprises an optical transmitter for transmitting the amplified modulated signal through a free-space medium.

In some embodiments, the system further comprises: a receiver to receive the amplified modulated signal; a demodulator, coupled to the receiver, for generating a demodulated signal from the amplified signal; and a digital signal processor (DSP), coupled to the demodulator, and operable to reconstruct the demodulated signal to generate a reconstructed signal.

In some embodiments, the DSP uses a carrier phase recovery (CPR) algorithm to generate the reconstructed signal.

In some embodiments, the CPR algorithm is at least one of a Blind Phase Search (BPS) recovery algorithm and Viterbi-Viterbi (VV) feed forward phase recovery algorithm.

In some embodiments, the first modulator applies phase modulation to the input optical signal to generate the modulated signal.

In some embodiments, the second modulator is a zero-chirp modulator.

In some embodiments, the second modulator is a Mach-Zehnder modulator (MZM).

In some embodiments, the second modulator is a low-duty cycle intensity modulator.

In some embodiments, the average-power limited optical amplifier is one of an optical fiber amplifier, and a semiconductor optical amplifier (SOA).

According to another broad aspect of the invention, there is disclosed a method for free-space optical communication, the method comprises: receiving, at a first modulator, an input optical signal; generating, at the first modulator, a modulated optical signal, wherein the modulated signal includes a plurality of modulated pulse frames, and each modulated pulse frame comprises a first number of pulses; receiving, at a second modulator coupled to the first modulator, the modulated signal; operating the second modulator to turn-off a select number of pulses in each modulated pulse frame to generate a low-duty cycle modulated signal, wherein the low-duty cycle modulated signal comprises a plurality of low-duty cycle pulse frames with each low-duty cycle pulse frame corresponding to one of the modulated pulse frames, and each low-duty cycle pulse frame comprises a second number of pulses, wherein the second number of pulses is equal to the first number of pulses minus the select number of pulses; receiving, at an average-power limited optical amplifier coupled to the second modulator, the low-duty cycle modulated signal; generating, using the average-power limited optical amplifier, an amplified modulated signal from the low-duty cycle signal, wherein the amplified modulated signal comprises a plurality of amplified pulse frames with each amplified pulse frame defining an amplified version of a corresponding each low-duty cycle pulse frame; wherein each amplified pulse frame, in the amplified signal, has an average power corresponding to the average output power ($P_{average}$) of the optical amplifier, and wherein each amplified pulse, in each amplified pulse frame, has an amplified pulse power that corresponds to a ratio of the average output power, wherein the ratio corresponds to a ratio of the first number of pulses to the second number of pulses, and wherein the amplified pulse power of each pulse in each amplified pulse frame is adjustable by adjusting the select number of pulses turned-off by the second modulator in each modulated pulse frame.

In some embodiments, the method further comprises transmitting, using an optical transmitter, the amplified modulated signal through a free-space medium.

In some embodiments, the method further comprises: receiving, at a receiver, the amplified modulated signal; generating, using a demodulator coupled to the receiver, a demodulated signal from the amplified signal; and reconstructing, using a digital signal processor (DSP) coupled to the demodulator, the demodulated signal to generate a reconstructed signal.

In some embodiments, the DSP uses a carrier phase recovery (CPR) algorithm to generate the reconstructed signal.

In some embodiments, the CPR algorithm is at least one of a Blind Phase Search (BPS) recovery algorithm and Viterbi-Viterbi (VV) feed forward phase recovery algorithm.

In some embodiments, the first modulator applies phase modulation to the input optical signal to generate the modulated signal.

In some embodiments, the second modulator is a zero-chirp modulator.

In some embodiments, the second modulator is a Mach-Zehnder modulator (MZM).

In some embodiments, the second modulator is a low-duty cycle intensity modulator.

In some embodiments, the average-power limited optical amplifier is one of an optical fiber amplifier, and a semiconductor optical amplifier (SOA).

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 2A is an example free space optical communication link, according to some embodiments;

FIG. 2B is an example free space optical communication link, according to some other embodiments;

Figure 1:
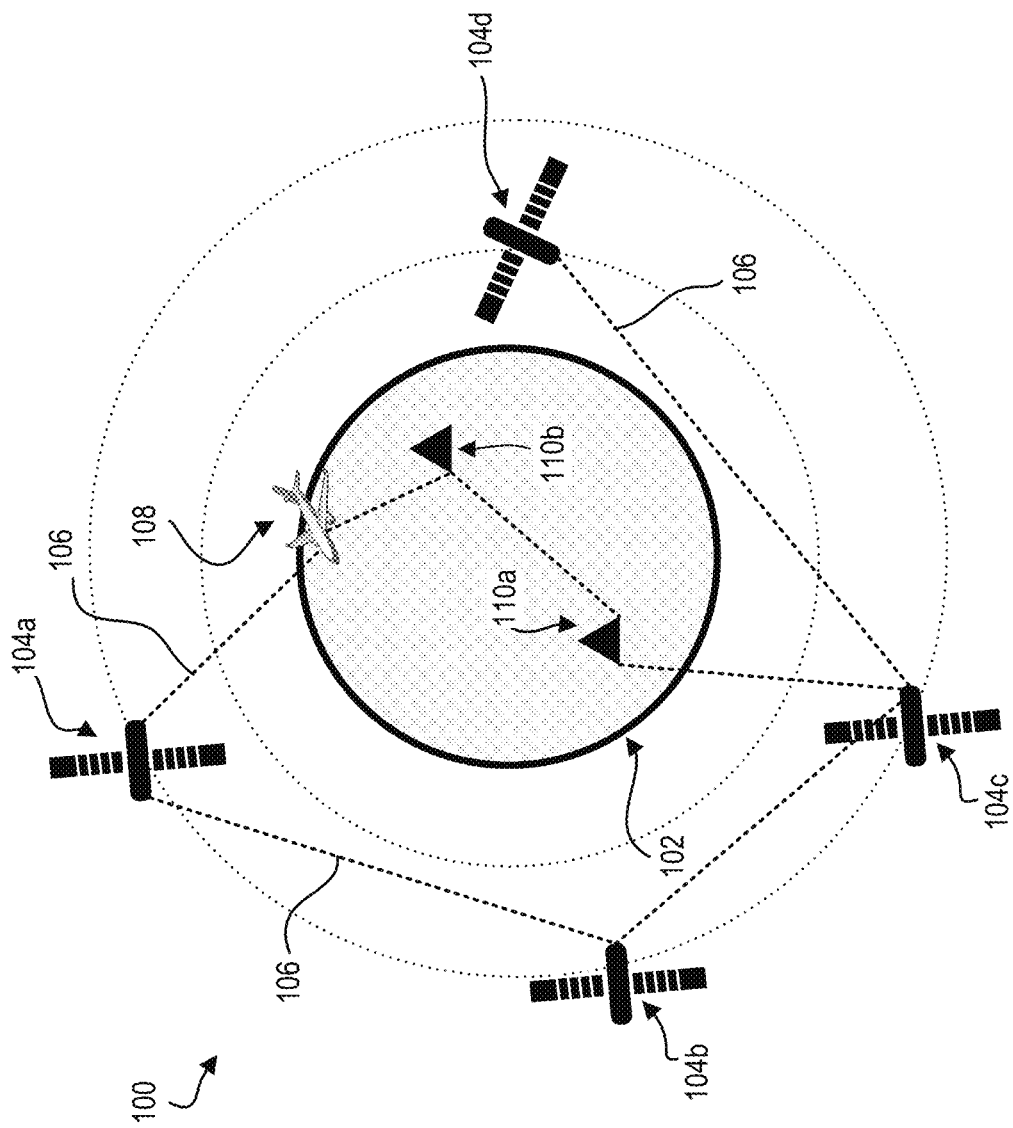
FIG. 1 is an example environment for a free space optical communication system.

Further aspects and features of the example embodiments described herein will appear from the following description taken together with the accompanying drawings.

DETAILED DESCRIPTION OF THE EMBODIMENTS

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the description and drawings herein, reference may be made to a Cartesian co-ordinate system in which the vertical direction, or z-axis, extends in an up and down orientation from bottom to top. The x-axis extends in a first horizontal or width dimension perpendicular to the z-axis, and the y-axis extends cross-wise horizontally relative to the x-axis in a second horizontal or length dimension.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

As discussed in the background, as a result of the large propagation distances characteristic of conventional FSO links, transmitted signals often experience high signal strength attenuation by the time they arrive at a receiver-side optical terminal. This, in turn, raises challenges in demodulating the received signal and recovering carried data information. The challenge is often further accentuated in high speed data communication, in which extreme signal attenuation can compromise the receiver's ability to accurately recover the high data rate signal. In view of the foregoing, there is a desire for an optical communication system which can mitigate for range loss issues in transmitted signals, and which has application in the context of high speed data communication.

More particularly, it has been recognized that unique challenges exist for mitigating range loss issues in the context of FSO communication. In particular, mitigating for range loss issues for FSO links requires accommodating for the specific systems used to demodulate and reconstruct received FSO data signals at receiver-side optical terminals.

In conventional FSO communication systems, and especially in high-speed FSO communication systems, data is typically transmitted by phase modulating a carrier optical signal (e.g., a laser beam) such that a modulated optical signal is generated which includes a sequence of multi-photon pulses with varying phase shifts, each phase shift corresponding to a unique data symbol (e.g., one more bits of information). In various cases, the amplitude of the carrier signal can also be varied, i.e., in addition to the phase, to encode a wider array of data. Examples of phase modulation schemes, and related variants, include n-PSK (phase-shift key) modulation, quadrature phase shift keying (QPSK), dual-polarization quadrature phase shift keying (DP-QPSK), offset phase shift keying (OPSK) modulation and n-QAM (quadrature amplitude modulation). The modulated optical signals are then transmitted by an optical transmitter assembly, over an FSO communication channel (e.g., a vacuum or air medium), to a designated external optical receiver.

At the optical receiver, the modulated optical signal is fed through a coherent demodulator, and further processed by a digital signal processor (DSP).

In particular, coherent demodulators mix the received modulated optical signal with a local oscillator (LO) signal, oscillating at the same signal frequency as the received signal. This generates one or more intermediate optical output signals, which are converted into electrical signals by photodetectors, and further sampled by analog-to-digital converters (ADCs).

The digital signal processor (DSP) receives the electrical, digitized signal, and operates to correct for various time-varying and transmission-related errors, which prevent proper decoding of signal data, especially at high data rates of transmission. Example error correction algorithms carried out by the DSP include carrier phase recovery (CPR) algorithms, carrier frequency recovery (CFR) algorithms, as well as forward error correction (FEC) algorithms.

More particularly, carrier phase recovery (CPR) algorithms correct for phase noise introduced by one or more of the transmitting and LO lasers. Generally, the CPR algorithm operates as a high-speed control loop, which actively and continuously compensates in real-time for phase noise in the signal. The CPR reconstructs the signal phase, correcting for polarization mode dispersion (PMD), chromatic dispersion and other phase and frequency effects, and ensures that data discrimination may occur based on correctly extracted signal phases. Examples of common CPR algorithms include both blind phase search (BPS) recovery and Viterbi-Viterbi (VV) feed-forward phase recovery. CFR algorithms also operate in an analogous manner to detect and correct for slow-moving frequency drifts between the carrier and LO signals, which can also affect proper phase tracking during data recovery. Examples of CFR algorithms include radius-directed (RD)-$4^{th}$ power frequency offset estimation (FOE) and circular harmonic expansion (CHE) algorithms.

Recovery algorithms (e.g., CPR and CFR algorithms) find particular importance in continuous data signal transmission, in contrast to other modes of data transmission. For example, carrier recovery algorithms may not find significant application in burst mode transmission. In burst mode transmission, discretely transmitted data symbols (e.g., pulses) are interposed by extended periods of drop-out. This results in an effective line rate (e.g., data rate) inside the burst which is generally higher than the average signal line rate over a given transmitted burst frame (e.g., a repeated pattern of one or multiple bursts followed by one or multiple drop out periods). In continuous data transmission, by contrast, the effective line rate—during any transmitted pulse or symbol—is substantially equal to the average signal line rate in any transmitted frame. Additionally, in the case of burst-mode transmission—and in contrast to continuous transmission—the start and end of the discrete burst signals are easily recognized by the receiver, allowing data to be recovered by simply filtering the discrete signal against known data sequences (i.e., identified in the burst frame header) to identify appropriate modulating and timing parameters (e.g., pulse frequency, phase, frame length, etc.). Further, burst-rate communication systems typically transmit data at lower speeds using simple modulation formats such as amplitude modulation (PAM, OOK, PPM) or binary phase shift keying (BPSK), which do not require the use of CPR and CFR algorithms. For this reason, systems which rely primarily on burst mode transmission may not require receiver-side DSPs performing phase and/or frequency carrier recovery.

Once the DSP has completed carrier phase and frequency recovery, and has discriminated the phase and amplitude states of the received symbols in order to digitize the data, the DSP may also perform forward error correction (FEC) to detect and correct for detection-based errors (bit flipping, etc.) in the received signal.

In view of the foregoing, an optical communication system which compensates for signal range loss—in continuous signal transmission—is required to accommodate the unique operation of the receiver-end DSP system, such as to avoid disrupting the DSP carrier recovery and forward error correction (FEC) algorithms.

Accordingly, embodiments provided herein provide for a range-enhanced optical communication system. The optical communication system is configured to boost (e.g., amplify) the signal strength of a transmitted optical signal. This, in turn, allows for transmitting and receiving optical signals over greater propagation distances. The provided optical communication system may also enable for more effective FSO communication using existing digital coherent optical (DCO) receivers (e.g., existing 100 Gpbs or 200 Gbps DCOs) by imparting higher sensitivity to these systems through increased received signal intensity, at the expense of reducing the overall data rate. Additionally, the provided system may enable existing receivers operating at high data rates (e.g., greater than 100 Gbps) to have competitive sensitivity with lower data rate systems (e.g., 10 Gpbs systems), also resulting from the increased power of the transmitted signal.

Importantly, and as provided in further detail herein, the provided optical communication system allows for increased signal power while providing minimal disruption to receiver-side recovery and forward error correction algorithms. In other words, the system increases signal power without substantially disrupting, or distorting the carrier phase recovery (CPR) and carrier frequency recovery (CFR) algorithms, as well as the forward error correction (FEC) algorithm. This, in turn, allows compatibility of the system with existing receiver systems (e.g., DCO systems), all the while enhancing their sensitivity and operational efficiency.

Referring now to FIG. 1, there is shown an example environment 100 for an optical communication system, in accordance with embodiments provided herein.

As shown, optical communication systems deployed for FSO communication allow data to be exchanged across air mediums and/or vacuums (e.g., space). For example, optical communication terminals may be installed on satellites 104a-104d orbiting a ground (e.g., earth) 102 reference, and may allow transmission and/or reception of optical signals 106 across vacuums (e.g., space) as between multiple satellites, as well as between satellites 104 and airborne objects 108 (e.g., an aircraft), or ground-based terminals 110a, 110b (e.g., mobile or stationary). FSO links may also be established between different ground-based terminals 110, as well as between ground-based terminals 110 and airborne objects 108.

Referring now to FIGS. 2A and 2B, there is shown simplified block diagrams for example free space optical (FSO) communication links, according to some embodiments.

As shown in FIG. 2A, optical communication link 200a includes an optical transmitter system 202 and an optical receiver system 204, which communicate data over a free space optical (FSO) communication channel 206. Channel 206 may be, for example, a vacuum or air-medium. The transmitter and receiver systems 202, 204 may be incorporated into optical communication terminals installed on satellites, airborne objects (e.g., aircrafts) or ground-based objects (e.g., mobile or stationary).

As shown in FIG. 2B, an optical communication link 200b may also include one or more transceivers 208a, 208b, each including a respective transmitter subsystem 202a, 202b and a respective receiver subsystem 204a, 204b. Accordingly, each transceiver may both transmit and receive optical signals. While only two transceivers have been illustrated in FIG. 2B for ease of exposition, it will be understood that an FSO communication network can include any number of communicating receivers, transmitters and/or transceivers.

Figure 3:
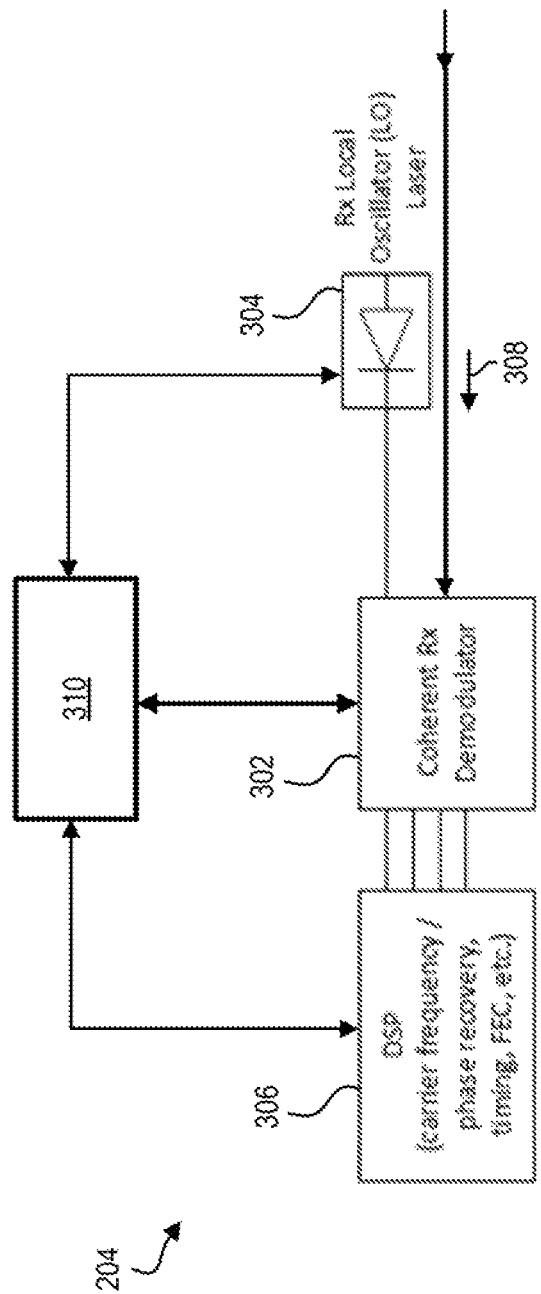
FIG. 3 is an example embodiment of an optical receiver system, in accordance with some embodiments.

Referring now to FIG. 3, there is shown an example optical receiving system 204, in accordance with some embodiments.

As shown, the receiver system 204 generally includes a signal demodulator 302, a local oscillator (LO) laser 304 and a digital signal processor (DSP) 306.

Signal demodulator 302 receives optical signals 308, which are transmitted by external sources. In some embodiments, an optical amplifier may be positioned ahead of the signal demodulator 302 to pre-amplify the received optical signal 308. Optical signal 308 is a modulated carrier signal encoded with transmitted data. For example, optical signal 308 can include a sequence of multi-photon pulses, each pulse encoding a data symbol expressing one or more bits of data. The data symbols in optical signal 308 may be encoded using one of a number of suitable phase modulation schemes or variants thereof, which are suitable for high speed data communication, including n-PSK (phase-shift key) modulation, quadrature phase shift keying (QPSK), dual-polarization quadrature phase shift keying (DP-QPSK), offset phase shift keying (OPSK) and n-QAM (quadrature amplitude modulation).

In at least some cases, the signal demodulator 302 may be a coherent demodulator and can include a 90° optical hybrid to accommodate received signals which are, for example, n-QPSK or n-QAM modulated. The optical hybrid mixes the incident modulated carrier signal, with an LO signal generated by the LO laser 304 having a similar frequency to the optical signal 308. The optical hybrid generates four intermediate demodulated quadratural state signals corresponding to the in-phase (I) and quadrature (Q) parts of the signal, as well as the inverses of the I and Q parts. The outputs of the optical hybrid are fed to photodetectors, which convert the intermediate optical signals into electrical signals, which are then converted to digital signals via analog-to-digital converters (ADCs).

The electrical, digitized and demodulated output signals, from the coherent demodulator 302, are fed to the DSP 306. DSP 306 operates to remove various time-varying distortions in order to reconstruct the signal's phase and frequency, as well as to detect and correct for transmission errors. The reconstructed and corrected signals may then be discriminated by the DSP 306 by mapping modulation parameters (e.g., phase, amplitude and/or frequency) to corresponding data symbols.

To remove time-varying distortions, DSPs—especially DSPs in receivers configured for high data rate transmission (e.g., over 100 Gbps)—may carry-out various carrier recovery algorithms, including carrier phase recovery (CPR) and carrier frequency recovery (CFR) algorithms. CPR algorithms remove phase distortions consequent of phase noise introduced by the transmitting and/or LO laser. CFR algorithms correct for frequency distortions resulting from frequency drifts which develop between the LO signal and the transmitted carrier signal over time, and which can result in poor phase tracking when recovering data symbols.

In various cases, the carrier frequency and phases recovery algorithms (collectively referred to herein as carrier recovery algorithms) may operate at frequencies of between 1 MHz and 1 GHz. At this rate, the recovery loop is typically under-sampled with respect to the actual transmitted symbol rate, which may be greater than 25 GHz. Accordingly, to mitigate for the under-sampling, rather than looping at the same rate as the communication channel, the recovery algorithms may accumulate multiple measurements over blocks of bits (also referred to herein as bit frames or data blocks). In this mode of operation, the recovery algorithm determines the average amount of phase or frequency offset over the duration of the data block, and uses the average to correct for the distortion by applying an equal frequency and phase bias in the opposite direction. In various cases, as provided herein, the data block length may be substantially equal to the length of a received data frame contained in the received signal 308.

Examples of CPR algorithms include blind phase search (BPS) recovery and Viterbi-Viterbi (VV) feed-forward phase recovery. Examples of CFR algorithms can include radius-directed (RD)-$4^{th}$ power frequency offset estimation (FOE) and circular harmonic expansion (CHE) algorithms.

Once the DSP has completed carrier phase and frequency recovery, and has discriminated the phase and amplitude states of the received symbols in order to digitize the data, DSP 306 can also complete the forward error correction (FEC) by applying a de-FEC algorithm. The de-FEC algorithm allows for detection and correction of discrimination-based errors (e.g., bit flips) through a pre-determined number of redundant error correcting bits (e.g., parity bits), which are transmitted with the modulated optical signal.

In some embodiments, the receiver 204 may also include a controller 310 which is coupled to one or more of the signal demodulator 302, LO laser 304 and DSP 306. Controller 310 may, for example, adjust the power and/or frequency of the LO laser 304. For example, controller 310 can adjust the frequency of the LO laser 304 to match the frequency of the received signal 308, or provide a stable frequency offset to the received signal 308. Controller 310 can also control the signal demodulator 302 to vary the demodulation scheme applied by the demodulator 302 (e.g. QPSK vs. DPQPSK). In still other cases, controller 310 can also control the DSP 306 to vary one or more of the de-FEC algorithm, as well as one or more parameters of the recovery algorithms (e.g., the bit frame or data block length of the recovery loops). In some embodiments, as provided in further detail herein, controller 310 can vary the de-modulation scheme, as well as DSP parameters based on information contained in the received signal 308. For example, the received signal 308 may include a plurality of data frames, each having a frame header (or otherwise trailing frame data), which can include information with respect to the FEC algorithm used, as well as the data frame length for the purpose of adjusting the DSP carrier recovery data block length. In other cases, as also provided herein, this information can be exchanged between the receiver 204 and transmitter 202 based on an initial "handshaking" protocol. In still other cases, the controller 310 can determine that the signal 308 is received from a designated transmitter 202, which uses known modulation schemes, FEC algorithms and data frame lengths.

Figure 4:
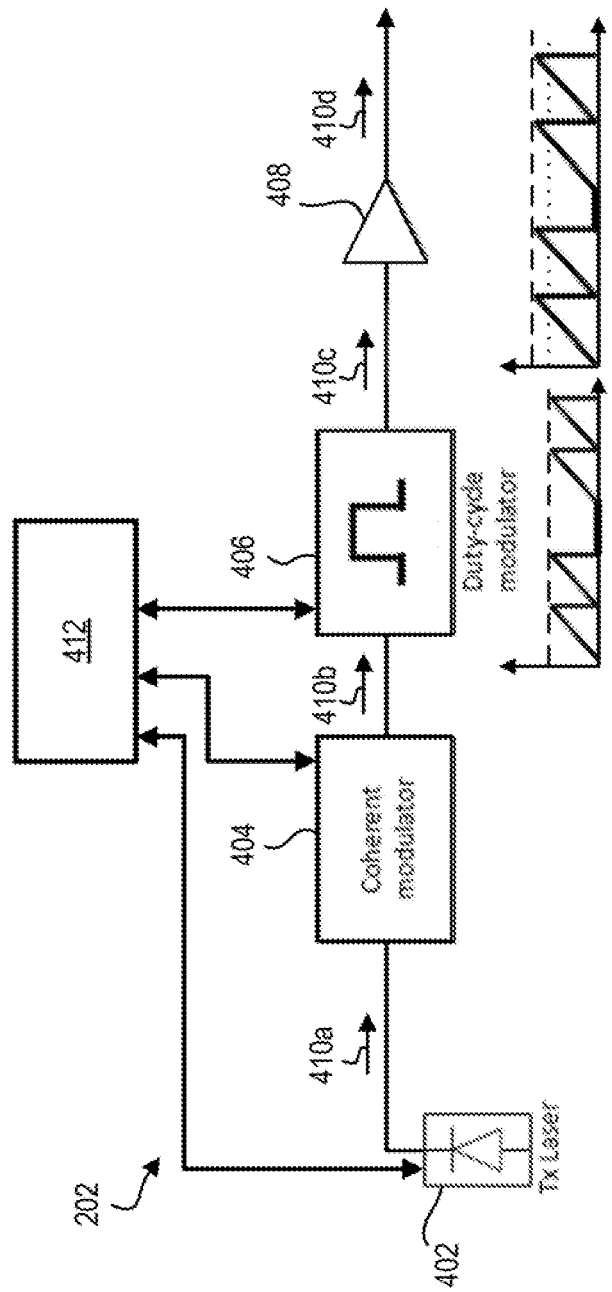
FIG. 4 is an example embodiment of an optical transmitter system, in accordance with some embodiments.

Referring now to FIG. 4, there is shown a simplified block diagram for an example optical transmitter system 202. As explained herein, the optical transmitter system 202 is configured to increase the signal strength of a transmitted optical signal without substantially affecting the operation of carrier recover and error correcting algorithms at the receiver-side DSP 306.

As shown, the transmitter system 202 generally includes a transmitting laser source 402 coupled to a signal modulator 404, a low-duty cycle intensity modulator 406, and an average-power limited optical amplifier 408. In some embodiments, a controller 412 may be provided and coupled to one or more of the laser source 402, signal modulator 404 and the low-duty cycle intensity modulator 406.

Transmitting source 402 may be, for example, a laser source for generating a laser signal beam 410a. In some cases, the output power of the laser source 402 can be varied by operation of the controller 412.

Signal modulator 404 receives a continuous unmodulated signal beam 410a, and modulates the signal beam 410a to encode data information and generate a continuous modulated signal 410b. Data modulated into the carrier signal 410a to generate the modulated signal 410b may be provided, for example, by the controller 412 coupled to the signal modulator 404.

In some embodiments, signal modulator 404 can be a coherent modulator which encodes data using a phase modulation scheme, or a variant thereof. The coherent modulator may use any suitable phase modulation scheme, including n-PSK (phase-shift key) modulation, quadrature phase shift keying (QPSK), dual-polarization quadrature phase shift keying (DP-QPSK), offset phase shift keying (OPSK) and n-QAM (quadrature amplitude modulation). The output modulated signal comprises a plurality of multi-photon pulses, each pulse corresponding to a data symbol (e.g., one or more bits of information), which is expressed by the phase and/or amplitude of the pulse.

The modulation scheme performed by the signal modulator 404 may be either fixed, or variable.

For example, in some cases, the signal modulator 404 may be operable to perform one of a number of variable modulation schemes (e.g., BPSK, QPSK, and DP-QPSK). The modulation schemes performed by the signal modulator 404 may be controlled and adjusted by the controller 412. In some cases, higher-order modulation schemes can be used to achieve higher data transmission rates. In other cases, lower-order modulation schemes can be used to minimize the incidence of noise and interference in the transmitted signal. In various cases, the selected modulation scheme can be adjusted with regard to the demodulation scheme performed at the receiver designated to receive the transmitted signal. For example, controller 412 may determine that a signal is designated for transmission to a receiver which performs a known demodulation scheme. This determination can be based on known demodulation schemes associated with known destination receivers. Otherwise, controller 412 can determine the receiver-side demodulation scheme based on a pre-transmission "handshake" protocol as between the transmitter 202 and receiver 204, in which modulation/demodulation scheme information is exchanged. Accordingly, the controller 412 may adjust the modulation scheme in the signal modulator 404 to complement the demodulation scheme at the receiver 204.

In various embodiments, signal modulator 404 may generate a continuous stream of modulated pulses (e.g., symbols) which are segmented into one or more data frames. For example, referring briefly to FIG. 6, there is shown a continuous data stream 602a. In the illustrated example, the continuous data stream 602a includes a first data frame 604a and a second data frame 604b, each generated by the signal modulator 404. Each data frame 604a, 604b includes a respective header portion 606a, 606b (e.g., an M-bit header portion 606), and a respective data content portion 608a, 608b (e.g., an N-bit data stream portion 608). As provided in further detail herein, the length of each data frame 604, may be synchronized with the length of the data block (e.g., bit frame) used for looping the carrier recovery algorithm in the receiver-side DSP 306.

Within each data frame 604, the data content portion 608 includes modulated pulses (e.g., symbols) generally carrying the transmitted data information. The header portion 606 includes modulated pulses (e.g., symbols) generally carrying, for example, routing information, frame structure data and frame length data. Although not illustrated, it will be appreciated that some or all of the data in the header portion 606 may also be appended to the end of each data frame 604.

In various cases, header portion 606 can also carry forward error correction (FEC) bits. The FEC bits are redundant bits (e.g., parity bits), which are redundant to at least some of the bits modulated in the data content portion 608, and are used for forward error correction (FEC) at the receiver-side DSP 306. The FEC bits can be generated using any suitable FEC algorithm. The FEC algorithm used can be either fixed, or variable. For example, controller 412 can vary the FEC coding algorithm based on the structure of the frame (e.g., frame length) or a modified duty cycle of the frame, and may instruct the receiver-side DSP 306 as to which de-FEC algorithm to use by inserting this information into the header 606. In other cases, the FEC algorithm can be selected to complement a de-FEC algorithm at the receiver-side DSP. The de-FEC algorithm at the receiver-side DSP 306 may be determined, for example, by controller 412 in a manner analogous to the manner for determining the receiver-side demodulation scheme, as previously explained.

Within each data frame 604, the signal modulator 404 can also modulate a pre-determined number of pulses which do not carry any transmission data. These pulses—referred to herein as "filler" pulses—contain random bits of data, or other forms of data, which are not intended for transmission.

Figure 6:
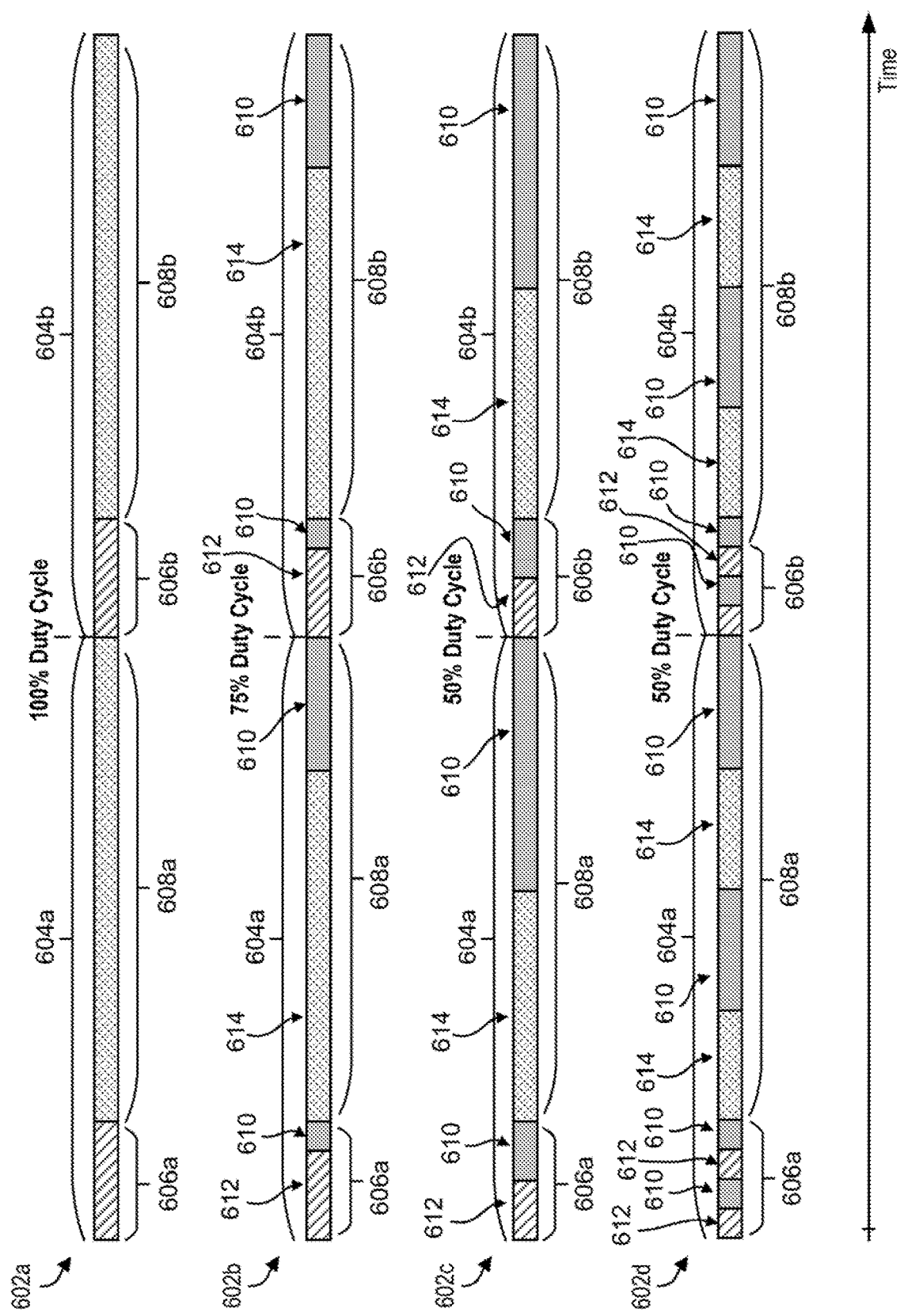
FIG. 6 shows example continuous data streams having varying duty cycles.

With continued reference to FIG. 6, as shown, within each data stream 602b, 602c and 602d—signal modulator 404 can insert a pre-determined number of filler pulses 610 in each of the header and/or data content portions 606, 608. For instance, in example data stream 602b, twenty-five percent (25%) of the header and data content portions 606, 608—within each data frame 604—are designated as filler pulses 610. The remaining segment of the header portion 606 (e.g., segment 612), as well as the data content portion 608 (e.g., segment 614) carry the transmittable data. Similarly, in example data streams 602c and 602d, fifty percent (50%) of the header and data content portions 606, 608—in each data frame 604—are designated for carrying filler pulses 610, while the remaining segments 612, 614 of the header and data content portions 606, 608, respectively, carry transmittable data. In various cases, data that would have otherwise been transmitted in the positions occupied by the filler pulses 610 may be transmitted by controller 412 in a subsequent data frame 604. The purpose of filler pulses 610 is shortly made clear with reference to the operation of the duty cycle modulator 406, in FIG. 4.

Referring now back to FIG. 4, duty cycle modulator 406 receives the continuous modulated signal 410b and further modulates the signal by strongly attenuating the filler pulses 610 (e.g., 70% to 100% strength attenuation), thereby reducing the overall pulse rate such that the outgoing data frame 604 contains only data intended for transmission (e.g., data segments 612 and 614 in FIG. 6). In this manner, the duty cycle modulator 406 reduces the overall data-rate of the transmitting system in that any data contained in the filler pulse sequences 610 are not transmitted.

Figure 5A:
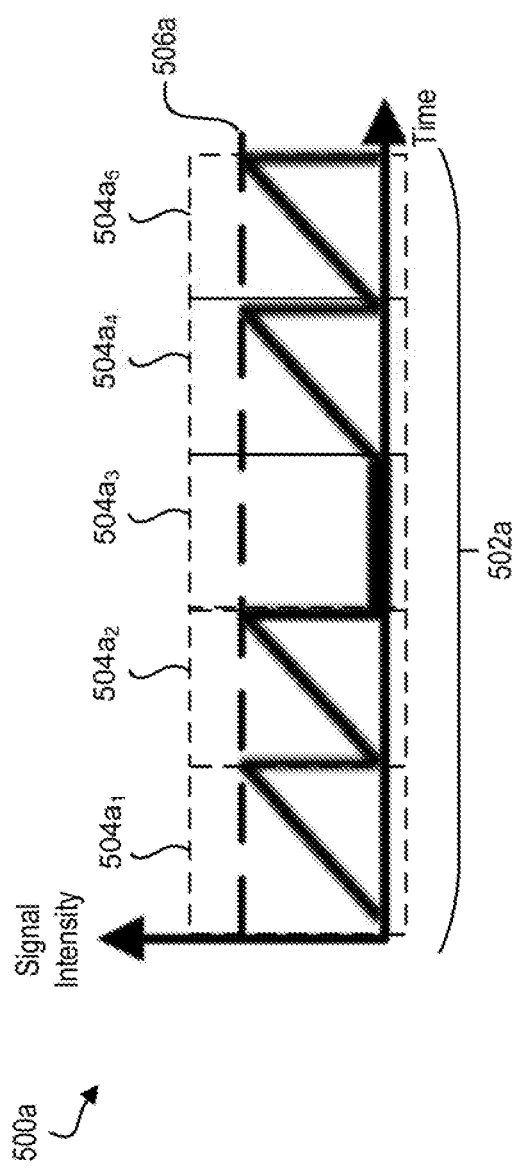
FIG. 5A is an example transmitted data frame, in accordance with some embodiments.

Referring now briefly to FIG. 5A, there is shown an example optical signal 500a generated by duty cycle modulator 406. As shown, optical signal 500a comprises a data frame 502a including five pulses $504a_1$-$504a_5$, wherein each pulse 504a corresponds to a transmitted data symbol. In the illustrated example, the duty cycle modulator 406 drops the third pulse $504a_3$ in the example data frame 502a, wherein the third pulse $504a_3$ is a designated filler pulse.

Referring now back FIG. 4, duty cycle modulator 406 drops (e.g., turns-off, or reduces the signal amplitude) the one or more filler pulses within a given data frame to output a low-duty cycle modulated signal 410c. For example, as shown in FIG. 6, as a result of dropping the filler pulses 610, the duty cycle of the example data stream 602b is reduced to a 75% duty cycle, while the duty cycle of the example data streams 602c and 602d is reduced to a 50% duty cycle.

In various embodiments, the duty cycle modulator 406 may be selected to achieve "zero-chirp" operation. A "zero-chirp" modulator introduces minimal phase and frequency distortion in the transmitted signal so as to avoid further disrupting the operation of the receiver-side phase and frequency recovery algorithm. For example, the low-duty cycle modulator 406 may be a zero-chirp Mach-Zehnder modulator (MZM) (e.g., a high-speed X-cut LiNbo MZM modulator). The MZM modulator can be used to achieve modulation speeds faster than the averaging speed of the recovery loop in order to drop the amplitude of a number of select pulses (e.g., the filler pulses 610 in FIG. 6) within a given data frame (e.g., data frames 604 in FIG. 6). For example, the MZM modulator can operate at a frequency of 40 GHz, which is greater than the recovery loop which operates at speeds between 100 KHz and 1 MHz.

In some embodiments, additional spectral filtering may be also applied to the low-duty cycle modulated signal 410c to eliminate spurious side-bands generated by the duty cycle modulator 406.

Average-power limited optical amplifier 408 receives the low-duty cycle modulated signal 410c, and boosts the signal strength of the remaining transmitted pulses in the pulse frame, all the while maintaining a constant average power for the respective data frame.

Figure 5B:
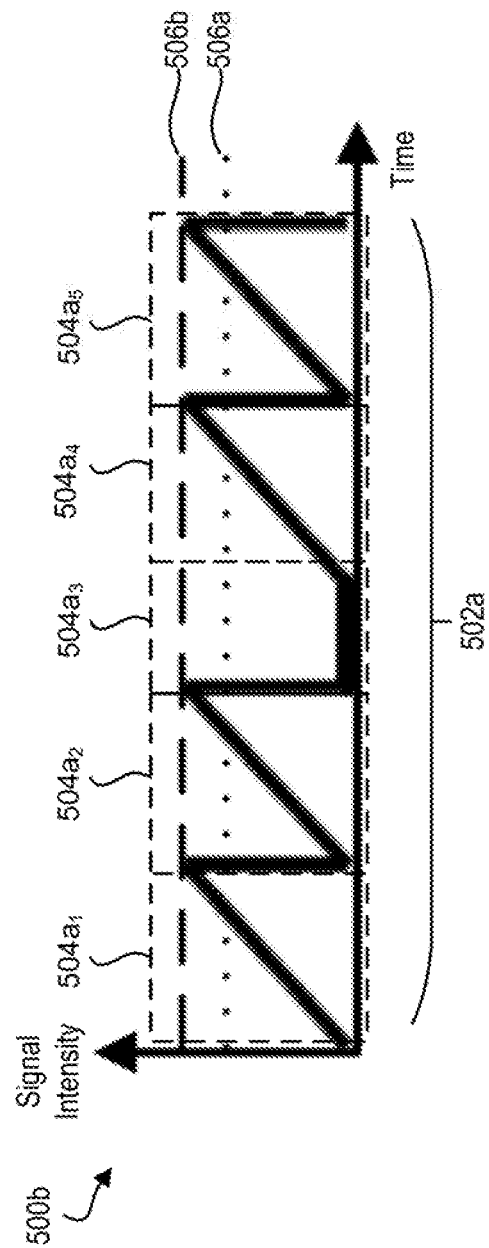
FIG. 5B is the example data frame shown in FIG. 5A, and amplified by an example average-power limited optical amplifier.
Figure 5C:
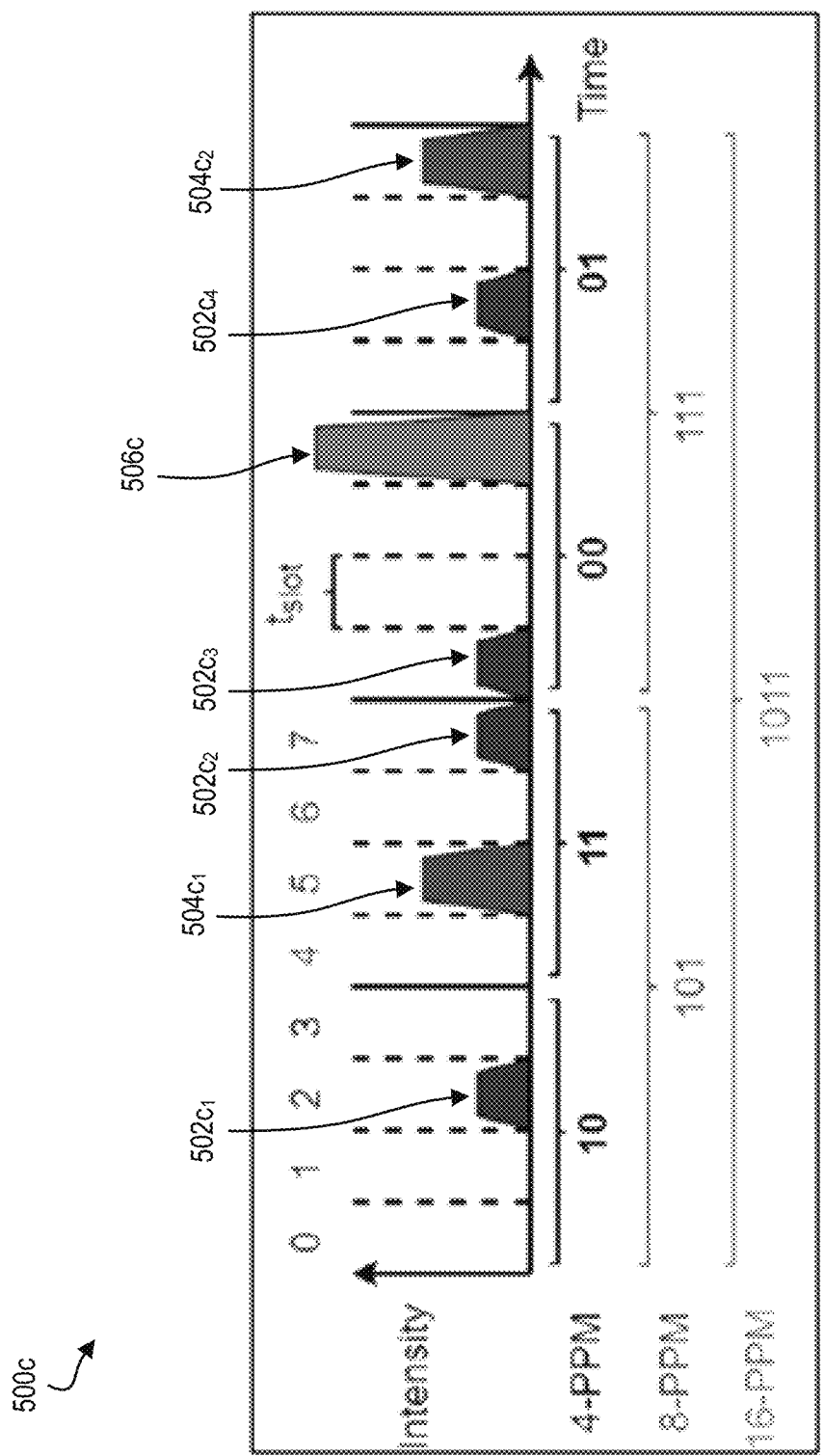
FIG. 5C is a diagrammatic illustration of the operation of an example average-power limited amplifier on various example pulse sequences.

Referring now briefly to FIG. 5C, which diagrammatically illustrates an example operation of an average-power limited optical amplifier. In particular, example diagram 500c illustrates a plurality of pulse frames—each being separately transmitted through an average-power limited optical amplifier—and which include pulses which encode data information using pulse-position modulation (PPM).

In a first example case, the pulse frame includes four PPM pulses $502c_1$-$502c_4$, each pulse 502c representing two bits of data. A 4-PPM scheme is used such that data is encoded based on the pulse position within one of four pulse position time slots ($t_{slot}$). In a second example case, two PPM pulses $504c_1$, $504c_2$ are used for encoding three bits of data each. An 8-PPM scheme is used such that data is encoded based on the pulse position in one of eight time slots. In a third example case, data is transmitted using a single PPM signal 506c encoding four bits of data, and a 16-PPM scheme is used such that the bit value is encoded based on the position of the pulse within one of sixteen time slots.

As shown, the effect of the example average-power limited optical amplifier is to progressively increase the signal strength as between pulse sequences 502c, 504c and 506c. In other words, pulse 506c has a greater signal strength than pulses 504c. Similarly, pulses 504c have a greater signal strength than pulses 502c. In each case, however, the average power—as between pulse sequences 502c, 504c and 506c—remains constant. In other words, as the number of pulses decreases, the average-power limited amplifier concentrates the remaining power into the fewer transmitted pulses so as to boost the pulse intensity, all the while maintaining a constant average output power for the pulse frame.

While FIG. 5C illustrates the operation of the average-power limited optical amplifier in the context of PPM signals, it has been appreciated that the same property of average-power limited optical amplifiers can be used to amplify transmitted phase modulated pulses.

Referring now back to FIG. 4, the average-power limited optical amplifier 408 receives the low-duty cycle modulated signal 410c, and amplifies the signal to generate an amplified modulated signal 410d. For example, as shown in the optical signal 500b in FIG. 5B, the signal strength of each pulse 504a—in data frame 502a—is boosted from an initial signal strength 506a (FIG. 5A) to an amplified signal strength 506b (FIG. 5B). This results from the average-power limited optical amplifier 408 re-concentrating power from the dropped filler pulse 504a$_3$, into the remaining transmitted pulses within the pulse frame. The average power of the pulse frame 502a is, however, constant between FIG. 5A and FIG. 5B.

Any suitable average-power limited optical amplifier 408 can be used in the transmitter 202. For example, the amplifier 408 can be an optical fiber amplifier (e.g., erbium-doped fiber-amplifier (EDFA), ytterbium-doped fiber amplifier (YDFA), thulium-doped fiber amplifier (TDFA)), or a semiconductor optical amplifier (SOA).

Accordingly, it has been recognized that the combination of the duty cycle modulator 406 and the average-power limited amplifier 408, is to amplify the signal strength of a transmitted data frame. More specifically, by artificially reducing (e.g., de-rating) the duty cycle of a transmitted signal (e.g., reducing the data throughput or bandwidth) by inserting and dropping one or more filler pulses in a given data frame, the average-power limited optical amplifier 408 is able re-concentrate power in the remaining transmitted pulses. This, in turn, amplifies the intensity of the transmitted data frame, thereby allowing the transmitted signal to traverse over greater propagation distances. Conversely, the transmitted signal can be transmitted over shorter distances using greater power. In particular, if the transmitter transmits a data frame having an average power (P$_{avg}$) and containing N pulses (e.g., 100 pulses) transmitted at a fixed repetition rate—wherein each pulse has a time duration (Δt)—an average-power limited optical amplifier 408 can increase the power of each pulse in the low-duty cycle data frame in accordance with equation (1).

$$P_{pulse} = P_{avg} \times \frac{N \times \Delta t}{N' \times \Delta t} \quad (1)$$

wherein P$_{pulse}$ is the amplified power of each pulse in the frame, P$_{avg}$ is the average output of the average-power limited optical amplifier 408, Δt is the time duration of each pulse, N is the number of pulses per frame in the original modulated signal, and N' is the number of pulses per frame in the low-duty cycle modulated signal, whereby N'<N. In other words, each amplified pulse frame, has an amplified pulse power corresponding to a ratio of the average output power expressed by the original number of transmitted pulses (N), to the remaining number of transmitted pulses (N') resulting from the low-duty cycle modulator 406.

By increasing signal strength through an artificial reduction in the data rate, the optical system may also enable for more effective FSO communication. In particular, increasing signal strength can impart higher sensitivity to digital coherent optical receivers (e.g. 10 Gpbs or 25 Gbps digital coherent optical (DCO) receivers) operating at a reduced data rate, as well as allowing high data rate receivers (e.g., 100 Gbps DCO receivers) to have competitive sensitivity with lower data rate receivers.

The combination of the signal modulator 404 and the low-duty cycle modulator 406 (e.g., the MZM modulator) can be used to insert and drop any number of filler pulses—within a given data frame—based on a desired pulse amplification for the data frame. For example, the operation of the signal modulator 404 and the low-duty cycle modulator 406 can be adjusted to vary the number of dropped filler pulses between a range of 0.1% to 50% of the total number of pulses in the transmitted frame to achieve a corresponding amplification of pulse intensity for a data frame.

For example, referring to FIG. 6, twenty-five percent (25%) of the modulated pulses in the continuous data stream 602b are allocated—within each of the header portion 606 and data content portion 608—as filler pulses 610 which are then dropped by the low-duty cycle modulator 406. Accordingly, the continuous data stream 602b generated by the low-duty cycle modulator 406 has a reduced duty cycle of 75%. FIG. 6 also shows example data streams 602c, 602d, in which fifty percent (50%) are allocated—within each of the header portion 606 and data content portion 608—as filler pulses 610 which are then dropped by the low-duty cycle modulator 406. Accordingly, the continuous data streams 602c and 602d generated by the low-duty cycle modulator 406 have a reduced duty cycle of 50%.

In some embodiments, controller 412 can control and synchronize operation of the signal modulator 404 and the low-duty cycle modulator 406 to achieve a desired duty cycle. For example, controller 412 can control signal modulator 404 to generate and insert a pre-determined number of filler pulses 610 within each data frame 604. Controller 412 can also control the signal modulator 404 to position the filler pulses 610 at pre-determined locations (e.g., positions) within each data frame 604. For example, in data streams 602b and 602c, signal modulator 404 is controlled to insert the filler pulses 610 at the end of each of the header and data content portions 606, 608, within each data frame 604. Otherwise, in data stream 602d, signal modulator 406 is controlled to insert and generate filler pulses 610 in a distributed manner within the header and data content portions 606, 608. The controller 412 may then control the duty cycle modulator 406 to drop the pre-designated pulses at the pre-designated positions, to generate the low-duty cycle modulated signal.

In other cases, controller 412 may not be required to control each of the signal modulator 404 and the low-duty cycle modulator 406. For example, signal modulator 404 can be pre-configured to allocate a pre-determined number of pulses in each data frame 604 as filler pulses 610, and at pre-determined positions. The low-duty cycle modulator 406 may then be configured, in turn, to drop (e.g., attenuate) the filler pulses having the known length and position in the received modulated signal. In some cases, the filler pulses 610 may also have a pre-determined bit sequence, which is known and identifiable to the low-duty cycle modulator 406. Accordingly, upon receiving the modulated signal, the low-duty cycle modulator 406 may automatically detect the filler bit sequence, determine that the bit sequence corresponds to a filler pulse, and proceed to drop the filler pulses 610. In this manner, the signal modulator 404 may insert the filler pulses at any location, and the low-duty cycle modulator 406 may automatically detect and drop the detected filler pulses.

In various cases, controller 412 may control the modulators 404, 406 to vary the number of dropped pulses per data frame having regard to the known propagation distance the signal will travel before it arrives at a designated destination receiver. In particular, to accommodate for the known propagation distance, controller 412 can increase (or decrease) the number of filler and dropped pulses in each data frame to increase (or decrease) the signal intensity of each pulse in the transmitted data frame. The propagation distance can also be determined by the controller 412 through an initial "handshaking" protocol with the receiver 204 in which the round-trip for an initial handshaking signal can be used to determine propagation distance. Otherwise, any suitable method for determining propagation distance can be employed (e.g., an external input).

In other embodiments, in addition or in alternative to the determined propagation distance, the appropriate duty cycle may itself also be determined through a pre-communication handshaking process. For example, prior to establishing a communication link, transmitter 202 may transmit a modulated signal to the receiver 204, wherein the modulated signal follows a fixed pattern sequence known and/or identifiable to both the transmitter 202 and the receiver 204. The transmitter 202 may then gradually increase or decrease the transmitted duty cycle until the receiver 204 communicates that the fixed sequence is received with sufficient signal intensity that it may be suitably demodulated and recovered. Once the suitable duty cycle is determined, the receiver 204 may communicate (e.g., instruct) the transmitter 202 to transmit signals at the selected duty cycle.

Controller 412 can also vary the duty cycle of the transmitted signal having regard to the degradation of the transmitter system. For example, over time, the transmitter 202 may experience degradation (e.g., telescope coating degradation, lens darkening, etc.), which in turn may result in poor transmission capabilities. Accordingly, to compensate for this degradation, the transmitter 202 can be adjusted (e.g., via controller 412) to operate at a lower data-rate to boost its outgoing signal power such that the optical degradation is cancelled out.

It has also been further appreciated that the use of a combined duty cycle modulator 406 and average-power limited amplifier 408 provides unique advantages in the particular context of FSO communication. For example, it is uncommon in fiber-based optical links to require reducing data transmission rates in order to boost transmitted optical signal strength. This is because fiber-based optical links generally do not require transmitting signals over large propagation distances spanning hundreds of thousands of kilometers, resulting in substantial signal range loss. Rather, terrestrial fiber-based links typically propagate signals over shorter distances spanning only a few hundred and/or thousand kilometers. Additionally, and in contrast to FSO based links, concentrating power in a few transmitted pulses using fiber-based links (e.g., via average power-limited optical amplifiers), may risk increasing the signal intensity to a degree where it may damage the fiber communication components. In various cases, the non-linear optical characteristics of fiber-based links can also heavily distort the transmitted signal at high power levels. These concern, however, are non-existent in FSO based communication links.

Significantly, it has been still further appreciated that the provided optical transmission system is able to provide increased transmitted signal strength, while avoiding disruptions to the receiver-side DSP recovery algorithm. In particular, this is done by ensuring that the data frame length (e.g., data frame 604 in FIG. 6) is equal to the length of the data block used by the DSP carrier recovery algorithm. Accordingly, the operation of the signal modulator 404 and low-duty cycle modulator 406 to generate, insert and drop a select number of filler pulses within a data frame (e.g., 0.1%-50% of pulses within a frame), does not substantially affect the averaging calculation performed by the recovery algorithm over the data block, to correct for phase noise and frequency drift. This allows the transmitting system to be used with pre-existing receiver and/or transceiver technology having DSPs using carrier phase and frequency recovery algorithms.

In various cases, controller 412 may synchronize the length of the data frame 604 with the data block length (e.g., bit frame length) used for looping the CPR and CFR algorithms at the receiver-side DSP 306. For example, the controller 412 may determine, based on the destination of the transmitted signal, that a receiver 204—designated to receive the transmitted signal—includes a DSP 306 which operates the recovery algorithms over pre-determined lengths of data blocks. Accordingly, based on this information, the controller 412 can modify the length of the data frame 604, generated by the signal modulator 404 (i.e., the length prior to dropping the filler pulses), to correspond to the length of the recovery algorithm block frame. In other cases, controller 412 can determine the suitable length of the data frame 604 based on an initial handshaking protocol between the transmitter 202 and the receiver 204, in which the block frame length for the receiver-side DSP recovery loop is communicated from the receiver 204 to the transmitter 202. In other cases, in the handshaking protocol, the transmitter 202 can communicate the data frame 604 length to the receiver 204, which can allow the receiver-side controller 310 to adjust the data block length for the recovery loop to match the received data frame 604 length. In still other cases, the data frame length 604 may be included in the header portion 606 of a data frame 604, which avoid the requirement for the initial handshaking protocol.

In at least some cases, where a large number of pulses are dropped from a given frame (e.g., 25% or 50%), the receiver-side DSP recovery algorithm can be enhanced by following a fixed pattern of "on" and "off" pulses. In this case, the DSP 306 can discard the LO phase and frequency values that are recovered in the received signal in the time-slots corresponding to the dropped pulses. The pattern of dropped pulses can be communicated by the transmitter 202 to the receiver 204 (e.g., receiver-side DSP 306 and/or controller 310) in a similar manner as the data frame length as explained previously.

The provided optical transmission systems can also be operated to minimize disruptions to the receiver-side FEC algorithm. In at least some embodiments—to accommodate for pre-set frames and pre-determined patterns of dropped of pulses—the receiver-side DSP 306, can include a digital buffer to delay passage of the of the FEC coded pulses (e.g., in the header portion 606) to the receiver-side de-FEC unit until a complete data frame (e.g., data frame 604) has been received. For example, FEC code pulses included in the header portion 606, of a transmitted data frame 604, may be held in the digital buffer until the complete data frame 604 is received, thereby allowing the de-FEC unit to access all FEC parity and data content bits. In some cases, the FEC code pulses may be held in the digital buffer having regard to a known duty cycle of the received signal. For example, FEC coded pulses in a 50% duty cycle signal may be held twice as longer as in a 100% duty cycle signal. In some cases, duty cycle information can be included in the header portion 606 to allow the de-FEC unit and/or digital buffer to accommodate for different data frames with different duty cycles.

In various cases, the FEC and de-FEC algorithms employed at the transmitter and receiver can be adjusted based on the duty cycle of the transmitted and received signal. For example, controller 412 in transmitter 202 can select a suitable FEC algorithm which is compatible with a specific data frame lengths resulting from the reduced duty cycle. The receiver-side DSP 304 will then also use the same de-FEC algorithm. In various cases, the FEC algorithm used by the transmitter 202 can be transmitted to the receiver 204 in-band or out-of-band from the transmitted data frame.

Figure 7A:
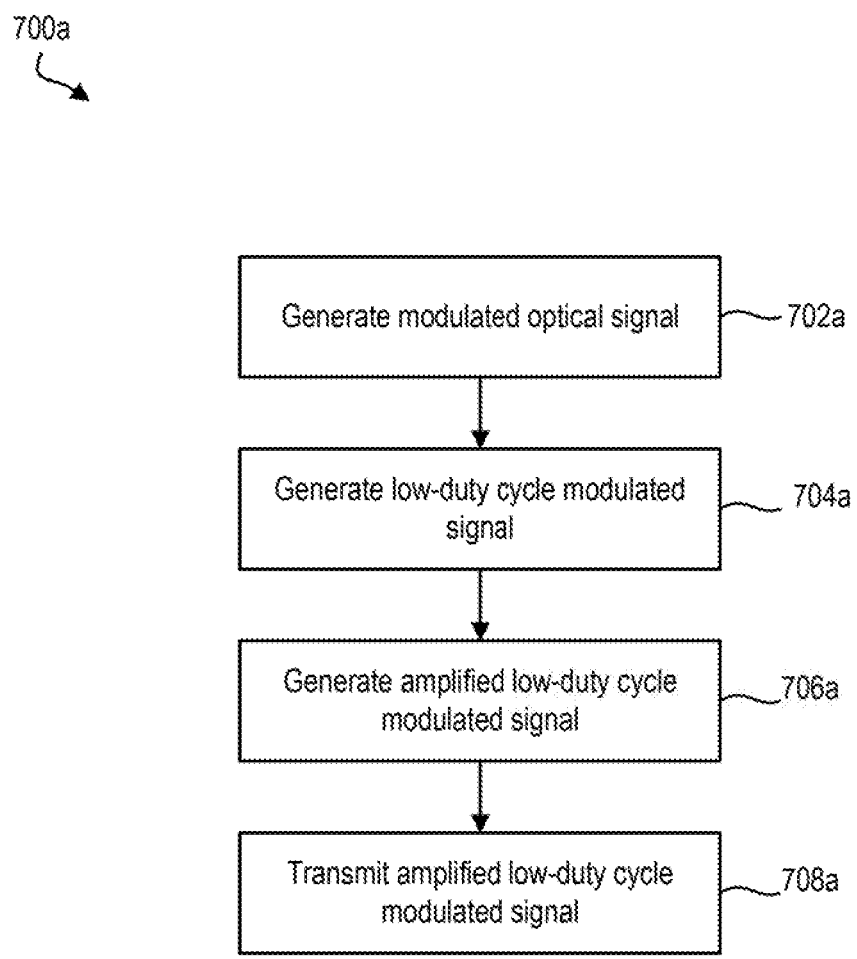
FIG. 7A is an example process flow for a method for transmitting optical signals in free space optical communication.

Referring now to FIG. 7A, which shows a process flow for an example method 700a for transmitting an optical signal in free space optical communication. The method 700a may be performed, for example, by the optical transmitter system 202 in FIG. 4.

At 702a, a laser beam is modulated by the signal modulator 404. For example, the signal can be modulated using a phase shift modulation scheme, or a variant thereof. The modulated signal can include a plurality of data pulses frames, each having a pre-determined number of pulses which encode data symbols. The pulses in each data frame may include pulses carrying transmittable data, as well as filler pulses containing non-useful (or non-transmittable data). In various cases, the signal modulator 404 can also encode, within each data frame, one or more pulses carrying redundant data information (e.g., parity bits) for the purpose of forward error correction at the receiver end (e.g., in a header portion of the data frame).

At 704a, the modulated optical signal, generated by the signal modulator 404, is fed to a low-duty cycle intensity modulator 406. The duty cycle modulator 406 artificially reduces the data rate of the transmitted signal by dropping (e.g., turning-off, or reducing the amplitude), the filler pulses within each data frame, to generate a low-duty cycle modulated signal including a plurality of low-duty cycle data frames.

At 706a, the low-duty cycle modulated signal is passed through the average-power limited optical amplifier 408, which boosts the intensity of each pulse in the data frame to generate an amplified modulated signal including a plurality of amplified data frames with each amplified data frame defining an amplified version of a corresponding each low-duty cycle data frame. In particular, the average-power limited optical amplifier 408 concentrates power into the remaining transmitted pulses while maintaining a constant average output power.

At 708a, the amplified optical signal is transmitted to an external destination. For instance, this can be done using an external optical transmitting assembly, which can include a telescope as well as coarse and fine pointing assemblies.

Figure 7B:
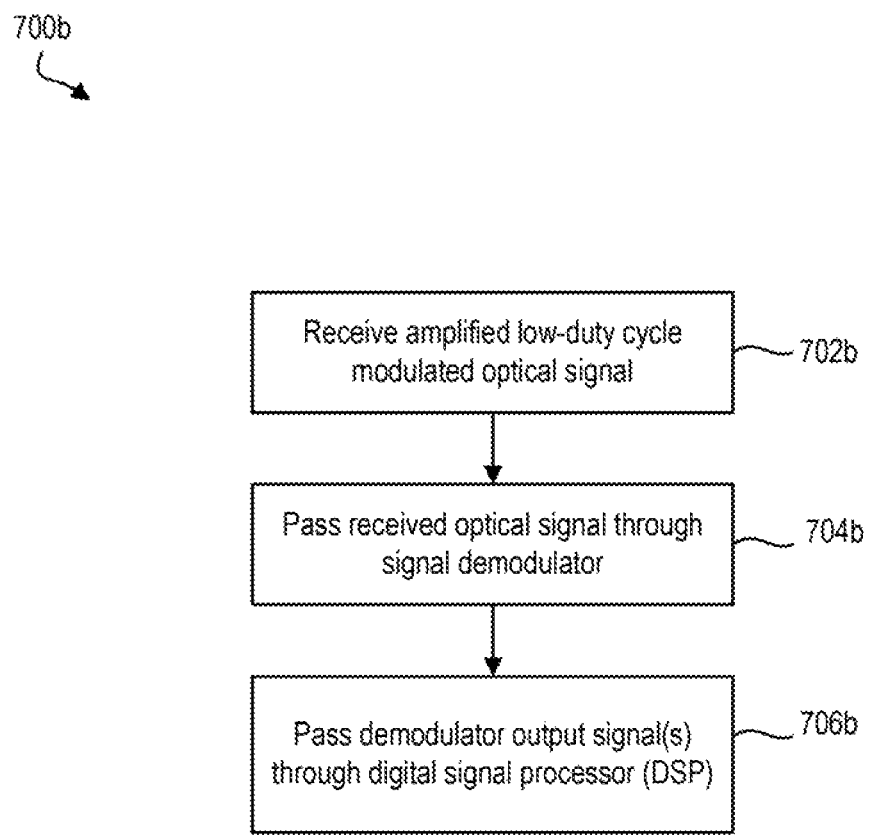
FIG. 7B is an example process flow for a method for receiving optical signals in free space optical communication.

Referring now to FIG. 7B, which shows a process flow for an example method 700b for receiving optical signals in free space optical communication. The method 700b may be performed, for example, by the optical receiver system 204 in FIG. 3.

At 702b, the receiver system 204 may receive an amplified low-duty cycle modulated signal including a plurality of amplified low-duty cycle data frames. For example, the receiver system 204 may include a receiver assembly which includes a telescope, as well as coarse and fine pointing assemblies, for receiving the signal.

At 704b, the received signal is passed through a signal demodulator (e.g., coherent demodulator 302). The signal demodulator 302 may mix the received signal with a local oscillator (LO) signal, generated by the LO oscillator 304, of similar frequency to the received carrier signal. The coherent demodulator 302 may then, in turn, generate one or more intermediate demodulated optical output signals. In some cases, the signal demodulator 302 may also include photo-detectors to convert the output optical signals into electrical signals, as well as ADCs for sampling.

In some embodiments, an amplifier may be positioned ahead of the signal demodulator 302 to amplify the received signal before the signal is passed to the demodulator 302.

At 706b, the output signals from the signal demodulator 302 are passed to a digital signal processor 306. The DSP 306 may apply carrier recovery algorithms (e.g., carrier phase recovery (CPR) and/or carrier frequency recovery (CPR)), to recover and reconstruct the phase and frequency of the transmitted and LO signals, for the purpose of decoding data information. Following CPR and CFR, the signal may be digitized, and the DSP 306 may also run forward error correction (FEC) algorithms based on redundant transmitted bits to identify and correct discrimination errors. The reconstructed and error corrected signals may then be decoded to extract the encoded data symbols.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A system for free-space optical communication, the system comprising:

a first modulator for receiving an input optical signal and generating a modulated optical signal, wherein the modulated signal includes a plurality of modulated pulse frames, and each modulated pulse frame comprises a first number of pulses;

a second modulator coupled to the first modulator, the second modulator receiving the modulated signal and operable to turn-off a select number of pulses in each modulated pulse frame to generate a low-duty cycle modulated signal, wherein the low-duty cycle modulated signal comprises a plurality of low-duty cycle pulse frames with each low-duty cycle pulse frame corresponding to one of the modulated pulse frames, and each low-duty cycle pulse frame comprises a second number of pulses, wherein the second number of pulses is equal to the first number of pulses minus the select number of pulses; and an average-power limited optical amplifier coupled to the second modulator, for generating an amplified modulated signal from the low-duty cycle signal, wherein the amplified modulated signal comprises a plurality of amplified pulse frames with each amplified pulse frame defining an amplified version of a corresponding each low-duty cycle pulse frame;

wherein each amplified pulse frame, in the amplified signal, has an average power corresponding to the average output power ($P_{average}$) of the optical amplifier, and wherein each amplified pulse, in each amplified pulse frame, has an amplified pulse power that corresponds to a ratio of the average output power, wherein the ratio corresponds to a ratio of the first number of pulses to the second number of pulses, and wherein the amplified pulse power of each pulse in each amplified pulse frame is adjustable by adjusting the select number of pulses turned-off by the second modulator in each modulated pulse frame.

2. The system of claim 1, further comprising an optical transmitter for transmitting the amplified modulated signal through a free-space medium.

3. The system of claim 1, further comprising:
a receiver to receive the amplified modulated signal;
a demodulator, coupled to the receiver, for generating a demodulated signal from the amplified signal; and
a digital signal processor (DSP), coupled to the demodulator, and operable to reconstruct the demodulated signal to generate a reconstructed signal.

4. The system of claim 3, wherein the DSP uses a carrier phase recovery (CPR) algorithm to generate the reconstructed signal.

5. The system of claim 4, wherein the CPR algorithm is at least one of a Blind Phase Search (BPS) recovery algorithm and Viterbi-Viterbi (VV) feed forward phase recovery algorithm.

6. The system of claim 1, wherein the first modulator applies phase modulation to the input optical signal to generate the modulated signal.

7. The system of claim 1, wherein the second modulator is a zero-chirp modulator.

8. The system of claim 7, wherein the second modulator is a Mach-Zehnder modulator (MZM).

9. The system of claim 1, wherein the second modulator is a low-duty cycle intensity modulator.

10. The system of claim 1, wherein the average-power limited optical amplifier is one of an optical fiber amplifier, and a semiconductor optical amplifier (SOA).

11. A method for free-space optical communication, the method comprising:
receiving, at a first modulator, an input optical signal;
generating, at the first modulator, a modulated optical signal, wherein the modulated signal includes a plurality of modulated pulse frames, and each modulated pulse frame comprises a first number of pulses;
receiving, at a second modulator coupled to the first modulator, the modulated signal;
operating the second modulator to turn-off a select number of pulses in each modulated pulse frame to generate a low-duty cycle modulated signal, wherein the low-duty cycle modulated signal comprises a plurality of low-duty cycle pulse frames with each low-duty cycle pulse frame corresponding to one of the modulated pulse frames, and each low-duty cycle pulse frame comprises a second number of pulses, wherein the second number of pulses is equal to the first number of pulses minus the select number of pulses;
receiving, at an average-power-limited optical amplifier coupled to the second modulator, the low-duty cycle modulated signal;
generating, using the average-power limited optical amplifier, an amplified modulated signal from the low-duty cycle signal, wherein the amplified modulated signal comprises a plurality of amplified pulse frames with each amplified pulse frame defining an amplified version of a corresponding each low-duty cycle pulse frame;
wherein each amplified pulse frame, in the amplified signal, has an average power corresponding to the average output power ($P_{average}$) of the optical amplifier, and
wherein each amplified pulse, in each amplified pulse frame, has an amplified pulse power that corresponds to a ratio of the average output power, wherein the ratio corresponds to a ratio of the first number of pulses to the second number of pulses, and
wherein the amplified pulse power of each pulse in each amplified pulse frame is adjustable by adjusting the select number of pulses turned-off by the second modulator in each modulated pulse frame.

12. The method of claim 11, further comprising transmitting, using an optical transmitter, the amplified modulated signal through a free-space medium.

13. The method of claim 11, further comprising:
receiving, at a receiver, the amplified modulated signal;
generating, using a demodulator coupled to the receiver, a demodulated signal from the amplified signal; and
reconstructing, using a digital signal processor (DSP) coupled to the demodulator, the demodulated signal to generate a reconstructed signal.

14. The method of claim 13, wherein the DSP uses a carrier phase recovery (CPR) algorithm to generate the reconstructed signal.

15. The method of claim 14, wherein the CPR algorithm is at least one of a Blind Phase Search (BPS) recovery algorithm and Viterbi-Viterbi (VV) feed forward phase recovery algorithm.

16. The method of claim 11, wherein the first modulator applies phase modulation to the input optical signal to generate the modulated signal.

17. The method of claim 11, wherein the second modulator is a zero-chirp modulator.

18. The method of claim 17, wherein the second modulator is a Mach-Zehnder modulator (MZM).

19. The method of claim 11, wherein the second modulator is a low-duty cycle intensity modulator.

20. The method of claim 11, wherein the average-power limited optical amplifier is one of an optical fiber amplifier, and a semiconductor optical amplifier (SOA).

* * * * *